United States Patent [19]

Rudd et al.

[11] Patent Number: 4,845,326
[45] Date of Patent: Jul. 4, 1989

[54] APPARATUS AND METHOD FOR ELECTRICALLY BUTT WELDING OF SKELP EDGE FACES WHICH HAVE BEEN PREHEATED

[75] Inventors: Wallace C. Rudd, New Canaan; Humfrey N. Udall, Darien; Robert R. Harriau, Old Greenwich, all of Conn.

[73] Assignee: Thermatool Corporation, Stamford, Conn.

[21] Appl. No.: 135,016

[22] Filed: Dec. 18, 1987

[51] Int. Cl.$^4$ .............................................. H05B 5/00
[52] U.S. Cl. .................................. 219/8.5; 219/10.79
[58] Field of Search ................. 219/10.79, 8.5, 9.5, 219/10.43, 10.491, 10.75, 10.67, 10.61 R, 10.57, 61.2

[56] References Cited

U.S. PATENT DOCUMENTS

| | | |
|---|---|---|
| 2,587,331 | 2/1952 | Jordan .................................. 219/9.5 |
| 2,647,981 | 8/1953 | Wogerbauer . |
| 2,692,322 | 10/1954 | Bennett . |
| 2,818,488 | 12/1957 | Rudd et al. . |
| 2,827,543 | 3/1958 | Rudd . |
| 2,827,544 | 3/1958 | Cable et al. . |
| 2,852,649 | 9/1958 | Limpel ................................ 219/8.5 |
| 2,876,323 | 3/1959 | Rudd ................................... 219/8.5 |
| 3,037,105 | 5/1962 | Kohler . |
| 3,127,674 | 4/1964 | Kohler . |
| 3,234,352 | 2/1966 | Morris et al. . |
| 3,414,697 | 12/1968 | Rudd . |
| 3,648,005 | 3/1972 | Rudd . |
| 4,197,441 | 4/1980 | Rudd ................................. 219/10.79 |
| 4,694,134 | 9/1987 | Ross ...................................... 219/8.5 |

FOREIGN PATENT DOCUMENTS 1236059 6/1959 France .................................. 219/8.5

Primary Examiner—E. A. Goldberg
Assistant Examiner—Lincoln Donovan
Attorney, Agent, or Firm—Brooks Haidt Haffner & Delahunty

[57] ABSTRACT

Method and apparatus for butt welding the edge faces of metal skelp which has been heated to a temperature of at least 1000° F. but below the welding temperature of the metal of the skelp. The skelp is continuously advanced through a furnace in which the skelp is heated to such temperature and then, to forming rolls where the skelp is formed into a substantially complete tube with closely spaced skelp edge faces, to a spacing roll for maintaining the edge faces in closely-spaced relation and to pressure rolls where the edge faces are pressed together. Intermediate the spacing roll and the pressure rolls, the edge faces are heated to welding temperature with an induction coil fed with electrical current having a frequency of at least 10 Khz. The induction coil does not encircle the skelp in its tubular forms and instead, has legs adjacent the edge faces and at opposite sides of the gap between the edge faces.

13 Claims, 3 Drawing Sheets

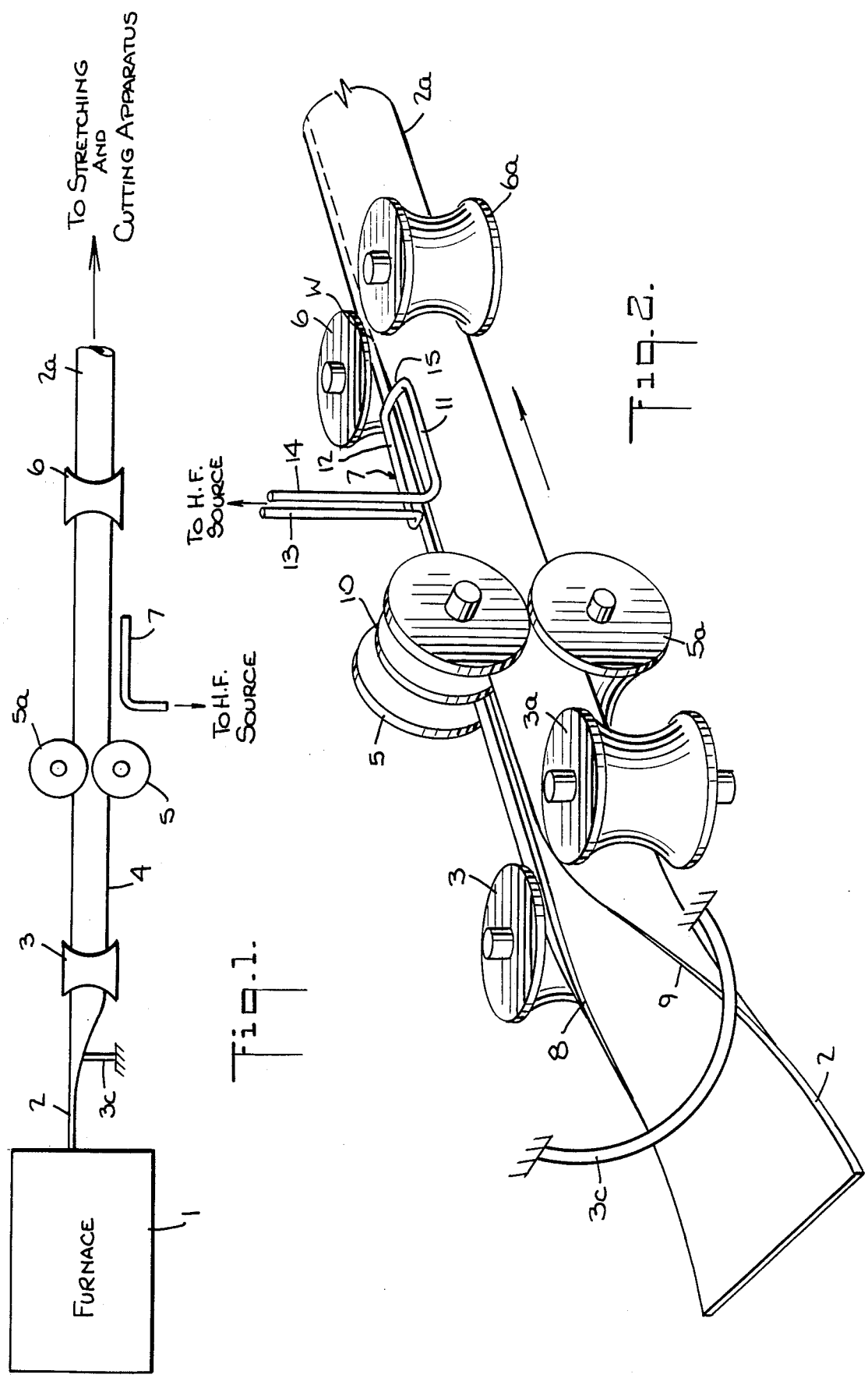

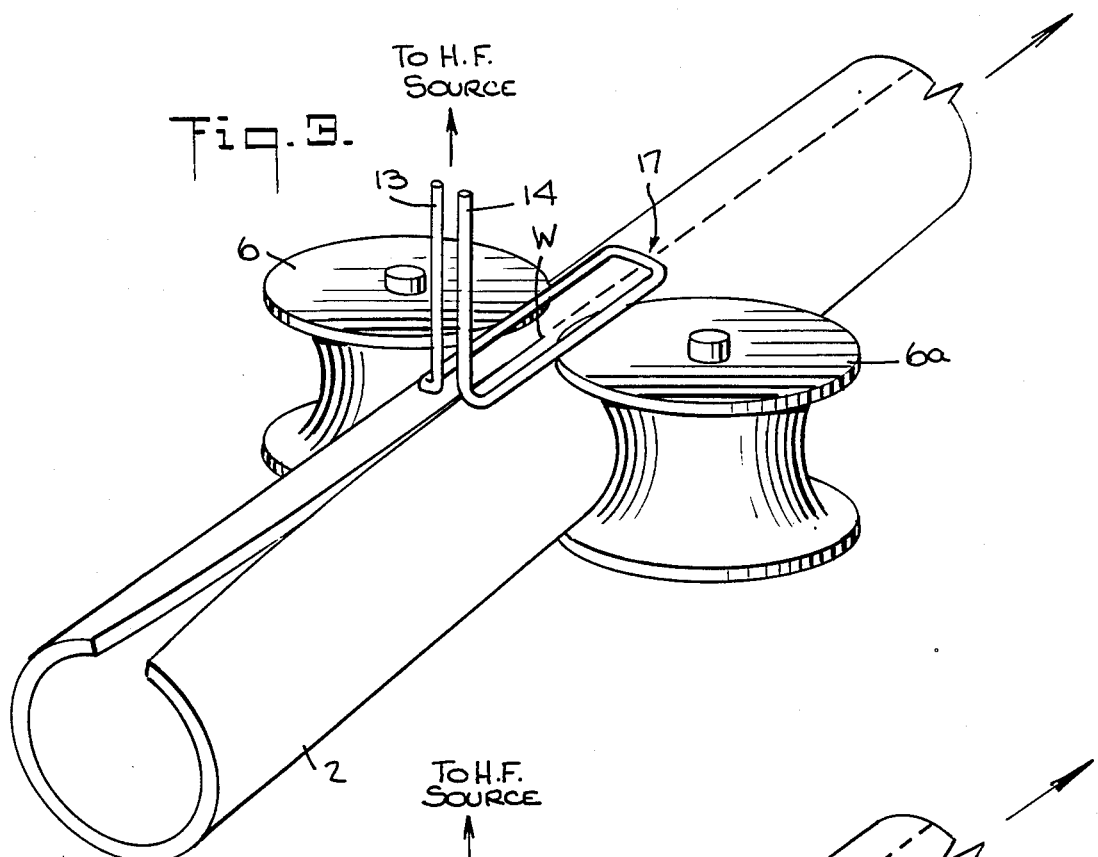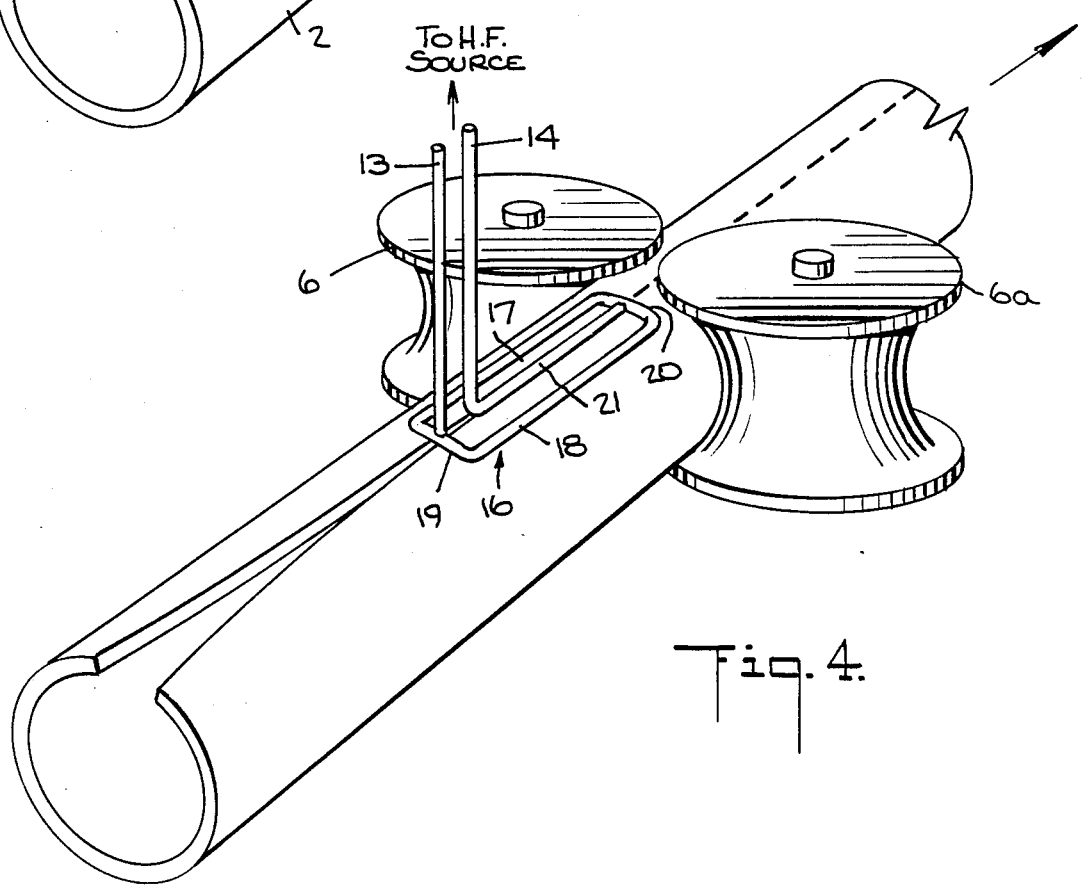

APPARATUS AND METHOD FOR ELECTRICALLY BUTT WELDING OF SKELP EDGE FACES WHICH HAVE BEEN PREHEATED

This invention relates to methods and apparatus for the manufacture of welded pipes and particularly, to methods and apparatus for welding pipes in which skelp is preheated in a furnace to an elevated temperature below welding temperature and is bent into an almost complete tube or pipe with the side edges of the skelp adjacent each other and in which the edge portions of the skelp are heated to welding temperature, after leaving the furnace, and are then welded together at a weld point.

In a known process, known as the "Fretz Moon" process, butt welded pipe is made by heating skelp in a furnace and forming it into a substantially complete tube or pipe with the side edges of the skelp adjacent each other. As the tube is advanced and the side edges are brought together oxygen or air is directed on the side edges to raise them to welding temperature, at which time the edge faces are pressed together. The main disadvantage of this process is that the entire skelp must be heated in the furnace nearly to welding temperature, whereas it is necessary to heat only the edge portions of the skelp to welding temperature to produce the desired weld. However, in such process, the tube or pipe is stretched by rolls downstream of the weld point, and in order to avoid excessive horsepower requirements for the drive for the stretch rolls, the temperature of the body of the tube must be at least 1800° F. when the tube is made of steel.

The process described in U.S. Pat. No. 4,357,512 attempts to overcome the above-mentioned disadvantage by heating the skelp in a furnace to below welding temperature and thereafter, heating the edge portions of the skelp to welding temperature by two heaters, each heater comprising induction coils fed by alternating current. While such process permits heating of the skelp in the furnace to a temperature lower than the welding temperature, nevertheless, the process does not provide optimum efficiency. In the first place, the heating of the skelp after it leaves the furnace takes place before the skelp is bent and substantially in advance of the weld point which means that heat is lost between the points at which the edge portions are heated and the weld point resulting in energy loss.

In the second place, due to the presence of the heaters, it is not possible to commence the bending of the skelp immediately upon its exit from the furnace making additional manufacturing space necessary.

In the third place, with the flat configuration of the skelp at the time that it is heated by induction heating, the heating current and hence, the heating, is not concentrated within a short distance from the edge faces, and instead, a substantial amount of metal, including the central portion of the skelp is traversed by the current causing non-useful heating of metal which is not required to be heated to provide the desired weld.

The temperature of the skelp as it leaves the furnace is relatively high and for example, with steel may be of the order of 2200° F. At the weld point itself, the temperature usually is higher and at such temperature, with conventional induction heating, the breakdown voltage of air is significantly lower than it is at room temperature and the electrical impedance of the metal is substantially reduced for steel. In addition, foreign matter, such as scale, may be present at and adjacent the weld point. Also, there are pressure rolls external to the tube and at the weld point for pressing the heated edge surfaces together for welding purposes, and such rolls divert part of the heating current from the tube. All these factors have made it appear to those skilled in the art that electrical heating of the edge portions of the skelp at, or immediately in advance of, the weld point is not feasible.

The advantages of using high frequency electrical currents, i.e. currents of 3 KHz or higher and particularly at 10 KHz and higher, to heat the edge portions of skelp being formed into a tube to welding temperature are well known in the art. One important advantage is that because of the proximity and skin effects, the heating current may be concentrated at and near the surfaces of the edge portions where the heating is desired. Thus, the heating efficiency is high and the edge portions may be heated rapidly to welding temperature. However, in the past such heating has been used only in processes in which the temperature of the skelp as it approaches the weld point is very low (usually room temperature) relative to the temperature of the skelp in the "Fretz Moon" process.

It is known in the art to heat the edge portions of a metal sheet or metal parts which are at low temperatures, i.e. below 200° F., to welding temperature by inducing electric currents therein by means of an induction coil supplied with electric current. See, for example, U.S. Pat. Nos. 1,915,047; 1,915,082; 2,763,756; 2,938,993; 2,131,285; 3,171,940 and 4,197,441. However, none of such patents disclose or suggest the use of such heating for skelp which has been previously heated to temperatures of 1000° F. or higher as in the "Fretz Moon" process.

Furthermore, the processes disclosed in U.S. Pat. Nos. 1,915,047 and 1,915,082 employ a coil outside the tube and at the weld point where it would interfere with the forming and weld rolls, require the inducing of voltages sufficient to cause arcing between the edge portions which is impractical and use low frequency currents, 1200Hz or less, to energize the induction coils.

Also, the processes disclosed in U.S. Pat. Nos. 3,131,285; 3,171,940 and 3,171,942 employ coils of a configuration which produce wasted heating at the back side of the tube, and with the internal coil disclosed, it has been found that sufficient coupling between the coil and the tube for the desired heating and hence, welding speeds, cannot be obtained. Furthermore, the conditions inside the tube are such that, with relatively small diameter tubes, the internal coil has a relatively short life.

One object of the invention is to provide methods and apparatus for electrically heating the edge portions of previously heated skelp immediately in advance of the weld point and where the skelp has been formed into a substantially closed tube. We have conducted numerous investigations over an extended period of time to accomplish such object and the principal problems have been to provide sufficient electrical current in the skelp edges as they approach the weld point to make the process commercially satisfactory and to provide apparatus which, under the operating conditions, will not only provide such current but also have a satisfactory working life. We have discovered a combination of apparatus and positioning of components thereof which permits the electrical welding together of the edges of preheated skelp efficiently and at relatively high speed.

In accordance with the preferred embodiment of the invention, skelp is heated in a furnace, as in the "Fretz Moon" process, to a temperature above 1800° F. but below welding temperature which latter temperature may be of the order of 2500° F. with steel. The skelp is advanced through the furnace and to a weld point and between the furnace and the weld point, the skelp, usually substantially flat as it leaves the furnace, is formed into a substantially closed tube with the edge surfaces in facing and adjacent, but spaced, relation. At the weld point, the edge surfaces are pressed together with welding pressure, and high frequency electrical currents are induced in the edge portions shortly in advance of the weld point by an induction coil disposed adjacent to the weld point, such currents flowing along the facing surfaces and through the metal at the weld point to heat the edge portions to their welding temperature as they reach the weld point. If desired, air or oxygen may be directed on the side edges of the skelp, as in the conventional method, to raise the temperature of the side edges further.

One advantage of the invention is that the edge portions of the skelp may be rapidly and efficiently heated to welding temperature at the weld point without the heat losses encountered when the skelp is electrically heated prior to forming the skelp into a substantially closed tube.

Another advantage of the invention is that the apparatus of the invention can be installed in prior art mills without interfering with apparatus already present, such as the furnace and the rolls employed to apply pressure at the weld point.

A further advantage of the invention is that the weld area is unobstructed by the electrical apparatus.

A further advantage is that tubing with an electrically welded seam is considered superior to tubing with a seam produced by the "Fretz Moon" process.

A further advantage is that the furnace can be operated at a temperature lower than the temperature required in the "Fretz Moon" process which results in a saving in energy, less material loss due to less scale formation and less furnace maintenance.

Other objects and advantages of the present invention will be apparent from the following detailed description of the presently preferred embodiments thereof, which description should be considered in conjunction with the accompanying drawings in which:

FIG. 1 is a schematic, side elevation view of the apparatus of the invention in combination with the apparatus of a Fretz Moon mill;

FIG. 2 is an enlarged, perspective view of a portion of the apparatus shown in FIG. 1 with the parts in inverted positions as compared to FIG. 1 for ease in illustration;

FIG. 3 is an enlarged, perspective view similar to FIG. 2 but illustrating the induction coil in a different position and omitting parts shown in FIG. 2;

FIG. 4 is similar to FIG. 3 but illustrates a modified form of the induction coil;

FIG. 1 illustrates schematically a portion of a Fretz Moon mill in association with the induction coil used to heat the edge faces of a metal strip prior to forcing the edge faces together to form a weld.

Figure 5:
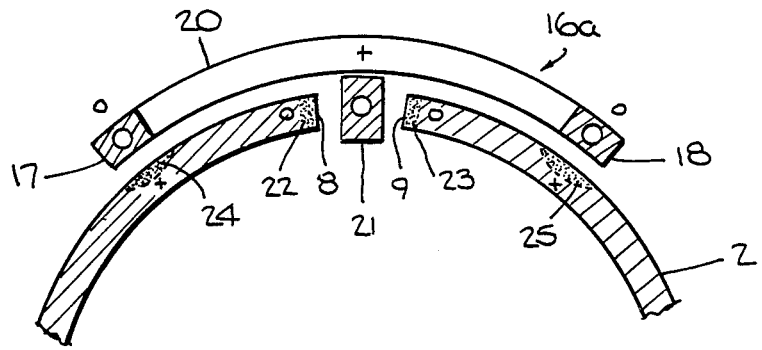
FIG. 5 is a fragmentary, cross-sectional view of a modified form of the induction coil in association with the tube being welded.

A conventional Fretz Moon mill comprises a furnace 1, and in the conventional Fretz Moon process, the metal strip 2 leaves the furnace 1 at a relatively high temperature, e.g. about 2500° F. for steel. The strip 2 is heated to such temperature across its entire width. The strip 2 is fed over a fixed rider bar (3c) to a first stand comprising forming rolls 3 and 3a (see FIG. 2) at which the strip 2 is formed into a partially formed tube with the edge faces of the strip 2 facing each other but in spaced relation. The gap between the edge faces normally is at the lower side 4 to keep water out of the tube and to permit scale and other foreign matter to drop out of the partially formed tube by gravity although it could be on top.

In a conventional "Fretz Moon" mill the weld is made at rolls 5 and 5a with squeeze rolls which do not have a center fin. Oxygen or air is blown on the seam just upstream from rolls 5 and 5a to raise the temperature of the strip edges to welding temperature.

Conventionally, after the tube 29 with the welded seam leaves the rolls 5 and 5a, the tube is further processed by apparatus (not shown) such as stretching apparatus and apparatus which cuts the tube into the desired lengths. For steel tube, it is desirable that the tube have a temperature of at least 1800° F. when it is stretched by such apparatus.

In accordance with the invention, after the partially formed tube leaves the rolls 3 and 3a, it passes between rolls 5 and 5a of the second stand where the strip 2 is further shaped into a tube, the edge faces of the strip 2 still being in spaced relation. After it leaves the rolls 5 and 5a, the partially formed tube enters a third stand comprising a pair of weld producing or squeeze rolls 6 and 6a (see FIG. 2) where the edge faces, at forge welding temperature, are pressed together to form a weld therebetween. The processing after the rolls 6 and 6a is the same as in a conventional Fretz Moon mill.

In accordance with the invention, the strip 2 is heated in the furnace 1 to a temperature less than the temperature to which it is heated in the conventional Fretz Moon process and less than the welding temperature, e.g. to a temperature of 1800°-2000° F., and the raising of the edge faces to welding temperature by an air or oxygen stream can be eliminated, but such stream may be used if desired. However, the edge faces are raised to welding temperature by the time that they reach the weld point by an induction coil 7 placed at, or immediately in advance of, the weld point. The coil 7 is connected to a source of high frequency electrical current, the frequency depending on the diameter of the tube but being at least 10 KHz and preferably, being at least 100 KHz. The higher frequency of at least 100 KHz is preferred because the current path around the back of the tube presents a higher impedance and because of the proximity and skin effects at such higher frequency.

FIG. 2 illustrates in perspective a portion of the apparatus shown in FIG. 1, but with the parts inverted for ease in illustration. As shown therein, the strip 2 has a pair of edge faces 8 and 9 which are brought into facing but spaced relation by the rider bar 3c and of the rolls 3 and 3a. In this embodiment, the rolls 5 and 5a further shape the strip 2 and the roll 5 has a center fin 10 which enters between the edge faces 8 and 9 to maintain them in proper alignment and spacing. The roll 5 can be made of metal or, if desired, of a high temperature insulating material such as silicon nitride. Preferably, it is made of conductive metal to provide a current path between the edge faces 8 and 9.

As previously stated, in a conventional Fretz Moon mill, the edge faces 8 and 9 are welded together at the rolls 5 and 5a, which do not have the fin 10, but in the apparatus of the invention, the edge faces 8 and 9 are not forced together to form a weld until they reach a weld point W between the rolls 6 and 6a.

After several experiments, it has been found that commercially viable heating of the edge faces 8 and 9 can be obtained with a conductive induction coil 7 shaped and disposed as shown in FIG. 2 or at a corresponding position within the partially formed tube if the tube has an inside diameter of 4 in. or greater. Such coil 7 has one leg 11 substantially parallel to and closely adjacent to the edge face 9 and has another leg 12 substantially parallel to and closely adjacent to the other edge face 8. The legs 11 and 12 are also substantially parallel and are fed with high frequency electrical current by the leads 13 and 14 and are interconnected by a cross-piece 15. The parts of the coil 7 are close to the adjacent surface of the strip 2 keeping in mind the spacing necessary to prevent arcing between the coil 7 and the strip 2.

With an induction coil, such as the coil 7, or an induction coil hereinafter described, the electrical current flows along the edge faces 8 and 9 at a relatively small depth and to and from the weld point W, and while the electrical current flows in return paths, mainly in paths underlying the legs 11 and 12, the entire width of the strip 2 is not appreciably heated by the current outside such return paths. Therefore, the edge faces 8 and 9 are rapidly heated to welding temperature relatively efficiently, and because the edge faces 8 and 9 are heated immediately in advance of, and at, the weld point W, the heat is not lost intermediate the point where they are electrically heated and the weld point W, further contributing to efficiency. Furthermore, since the strip 2 is preheated by the furnace 1, it is not necessary to provide electrical power sufficient to raise the temperature of the edge faces 8 and 9 from a low temperature, e.g. ambient or room temperature, to welding temperature.

Instead of the rectangular configuration shown, the coil 7 may have an oval shape or a circular shape, and the coil 7 may have a plurality of turns instead of the single turn shown. The coil 7 may be made of tubing through the interior of which water is flowed for cooling purposes. Of course, the coil 7 may be arcuate in cross-section so that all parts thereof are substantially equally spaced from the surface of the strip 2.

Because of the environment in which the coil 7 operates, a ceramic plate or ceramic blocks can be disposed intermediate the coil 7 and the strip 2 and attached to the coil 7. The coil 7 may also be encapsulated in an insulating material and/or a blast of air or water directed on the coil 7 may be used to remove debris.

In the embodiment shown in FIG. 2, the downstream end or cross-piece 15 of the coil is disposed in advance of the weld point W. The downstream end of the coil 7 may be downstream of the weld point W as shown in FIG. 3, a portion of the coil 7 also being upstream of the weld point W. Since portions of the coil 7 extend over lips of the rolls 6 and 6a, it may be desirable to make the rolls 6 and 6a of a ceramic material to eliminate current flow in such rolls.

An alternate embodiment of the induction coil is illustrated in FIG. 4. In this embodiment, the coil 16 has a loop formed by two substantially parallel legs 17 and 18 and two cross-pieces 19 and 20 with the H.F. lead 13 connected to the cross-piece 19 centrally thereof. A center leg 21, substantially parallel to the legs 17 and 18, extends from centrally of the cross-piece 20 to adjacent the cross-piece 19 where it is connected to the H.F. lead 14. The coil 16 may be disposed and protected in the same manner as the coil 7.

FIG. 4 illustrates the center leg 21 above the gap between the edge faces 8 and 9 which is satisfactory if the metal of the strip 2 is relatively thin. However, with a thicker strip 2, it may be desirable, for improving the electrical current distribution at the edge faces 8 and 9, to have the leg 21 of the coil 16a in the gap between the edge faces 8 and 9 as shown in FIG. 5. Shaded areas 22 and 23 illustrate the current distribution at the edge faces 8 and 9 and shaded areas 24 and 25 illustrate the current flow at the surface of the strip 2.

Figure 6:
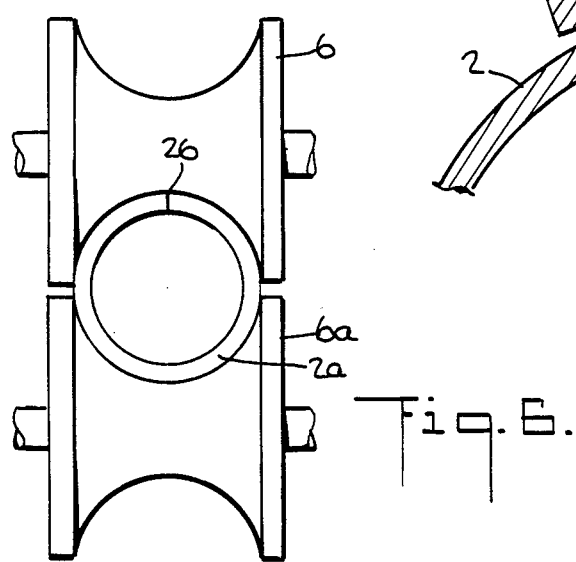
FIG. 6 is a fragmentary view, partly in cross-section, illustrating modified positions for the rolls at the weld point.

When the induction coil 7, 16 or 16a has its downstream end disposed in advance of the weld point W, as shown in FIGS. 2 and 4, the rolls 6 and 6a may be disposed with their axes extending at 90° to their positions shown in the preceding FIGS. as illustrated in FIG. 6. In this case, the roll 6 engages the weld seam 26, and preferably, the roll 6 is made of an insulating material such as a ceramic. The weld seam 26 could be at the upper side or the lower side of the tube 2a.

Figure 7:
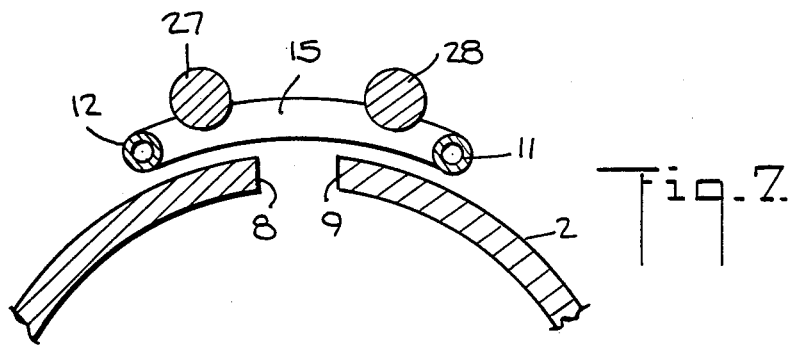
FIGS. 7 and 8 are fragmentary, cross-sectional views illustrating the use of magnetic cores to increase the electrical current flow in the edge faces of the tube to be welded.
Figure 8:
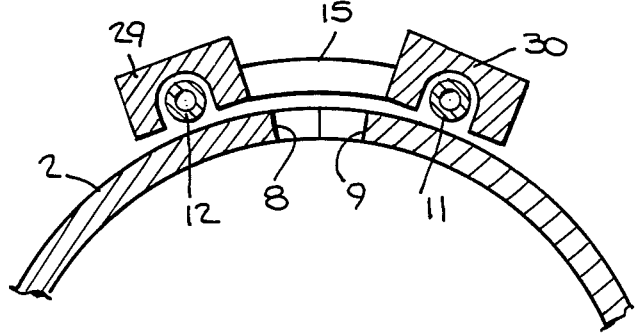

As previously mentioned, one of the problems with welding in the manner described is to provide adequate current at the edge faces 8 and 9 for welding at practical speeds. The current can be enhanced by using magnetic cores adjacent to the legs of the coil as shown in FIGS. 7 and 8 which illustrate the use of magnetic cores 27, 28, 29 and 30 adjacent the legs 11 and 12 of the coil 7. Of course, such magnetic cores could be similarly used with the other coils 16 and 16a described herein.

It will be apparent from the foregoing description of the methods and apparatus of the invention that the temperature to which it is necessary to heat the strip 2 in the furnace 1 may be substantially reduced as compared to the temperature required in the conventional Fretz Moon process. Such temperature is determined mainly by the temperature of the metal needed for stretching of the tube after it has been welded, e.g., for steel, in the range from 1800–2000° F. but less than the welding temperature which, for steel, is about 2500° F.

In addition, by the use of an induction coil disposed adjacent the weld point and high frequency electrical energizing current, only electrical energy sufficient to heat edge faces of the strip and the metal immediately adjacent thereto is required, and the heating is immediately in advance of and at the weld point. Due to the proximity and skin effects, the heating of the edge faces is concentrated at a relatively small depth so that the temperature of the edge faces is rapidly increased from the temperature at which they are when they arrive at the induction coil (substantially the temperature at which they leave the furnace 1) to the welding temperature.

Accordingly, by the use of the methods and apparatus, there is a substantial saving of energy, less scale and less furnace maintenance as compared to prior art Fretz Moon processes. In addition, by the use of the methods and apparatus of the invention, an electrically welded seam is produced which is considered to be superior to the seam produced by the prior art Fretz Moon process.

Although preferred embodiments of the present invention have been described and illustrated, it will be apparent to those skilled in the art that various modifications may be made without departing from the principles of the invention.

We claim:

1. A method for forming welded tubing from metal skelp comprising:

preheating a metal skelp to a temperature of at least 1000° F. but below the welding temperature of the metal of said skelp while advancing said skelp toward a weld point;

while advancing said skelp preheated to a temperature below the welding temperature of the metal of the skelp toward a weld point, forming it into a tube by bringing the edge portions of the skelp into adjacent but closely space relation and then pressing the edge portions together at the weld point;

raising the temperature of said edge portions to a temperature at least substantially equal to the welding temperature of the metal of said skelp, after the edge portions have been brought into adjacent but closely spaced relation and by the time that the edge portions are pressed together, by inducing high frequency electric current which flows in opposite directions at said edge portions, after they have been brought into adjacent but closely spaced relation, by means of an induction coil which has at least one turn and which has legs extending substantially parallel to said edge portions, at least two of said legs being disposed adjacent said edge portions but being spaced radially and circumferentially from said edge portions and being spaced from each other circumferentially of said almost completely formed tube by an amount less than the circumference of the last-mentioned said tube and said coil having the ends of said two legs nearer said weld point conductively interconnected by conducting means which extends across but in spaced relation to said edge portions, said coil being supplied with an electrically current of a frequency of at least 10 KHz and said coil extending, at least partially in advance of the weld point, said turn lying substantially in a plane extending substantially parallel to the axis of said tube and the magnitude of the current supplied to said turn being selected so that the induced voltage between said edge faces is less than the breakdown voltage between said edge faces but is sufficient to heat said edge faces to a temperature by the time that they are pressed together at said weld point.

2. A method as set forth in claim 1 wherein said skelp is formed substantially into a tube with edge faces of said skelp in closely-spaced, facing relationship with a gap therebetween prior to raising the temperature thereof to welding temperature and said faces are maintained in closely-spaced, facing relation while said portions have said electrical current induced therein.

3. A method as set forth in claim 2 wherein said conducting means is a cross-piece and said coil is disposed with one of said two legs substantially parallel to, and adjacent one of said faces and spaced circumferentially to said gap, with the other of said two legs substantiality parallel to and adjacent the other of said faces and spaced circumferentially to the other side of said gap and with said cross-piece adjacent said weld point.

4. A method as set forth in claim 3 wherein said cross-piece is spaced from said weld point in the direction opposite from the direction of advance of said skelp.

5. A method as set forth in claim 3 wherein said cross-piece is spaced from said weld point in the direction of advance of said skelp.

6. A method as set forth in claim 2 wherein said coil has three legs, a first one of said legs being disposed at one side of the gap in circumferentially spaced relation to one of said faces and extending substantiality parallel to said one of said faces, a second one of said legs being disposed at the opposite side of said gap in circumferentially spaced relation to the other of said faces and extending substantially parallel to said other of said faces and a third one of said legs being disposed at said gap and extending substantially parallel thereto, and wherein said conductive means is a first cross-piece interconnecting said ends of said first one and said second one of said legs and said third leg is conductively connected at the end thereof nearer said weld point to said first cross-piece and further comprising a second cross-piece conductively interconnecting the ends of said first one and said second one of said legs remote from said weld point and said electrical current being fed to said first one of said cross-piece and to the end of said third one of said legs remote from said weld point.

7. A method as set forth in claim 6 wherein a portion of said third leg is disposed in said gap.

8. Apparatus for butt welding together the edge faces of metal skelp, said apparatus comprising:

means for continuously advancing said skelp successively through a furnace for heating said skelp to a temperature of at least 1000° F. but below the welding temperature of the metal of said skelp, first means for forming said skelp into a partially formed tube with said faces in closely-spaced relation, second means for maintaining said faces in closely-spaced relation with a gap therebetween and third means spaced from said second means in the direction of advance of said skelp for pressing said faces together at a weld point; and an induction coil connected to a source of electrical current having a frequency of at least 10 KHz disposed with at least a portion thereof intermediate said second means and said third means for heating said faces welding temperature, said induction coil having legs extending substantially parallel to said faces, at least two of said legs being spaced apart by a distance greater than the spacing between said faces and less than the circumference of said partially formed tube and being disposed adjacent but radially and circumferentially spaced from said faces and said coil having the ends of said two legs nearer said weld point conductively interconnected by conductive means which extends across but in spaced relation to said faces.

9. Apparatus as set forth in claim 8 wherein said conductive means is a cross-piece and said coil is disposed with one of said two legs substantially parallel to and adjacent one of said faces and spaced circumferentially to one side of said gap, with the other of said two legs substantially parallel to and spaced circumferentially to the other of said faces and with said cross-piece adjacent said weld point.

10. Apparatus as set forth in claim 9 wherein said cross-piece is spaced from said weld point in the direction opposite from the direction of advance of said skelp.

11. Apparatus as set forth in claim 9 wherein said cross-piece is spaced from said weld point in the direction of advance of said skelp.

12. Apparatus as set forth in claim 8 wherein said coil has three legs, a first one of said legs being disposed at one side of the gap in circumferentially spaced relation to one of said faces and extending substantially parallel to said one of said faces, a second one of said legs being disposed at the opposite side of said gap in circumferentially spaced relation thereto and extending substantially parallel to the other of said faces and a third one of said legs being disposed at said gap and extending substantially parallel thereto, and wherein said conducting means is a first cross-piece interconnecting said ends of said first one of said second one of said legs and said third leg is conductively connected at the end thereof nearer said weld point to said first cross-piece and further comprising a second cross-piece conductively interconnecting the ends of said first one and said second one of said legs remote from said weld point and said electrically current being fed to said first one of said cross-pieces and to the end of said third one of said legs remote from said weld point.

13. Apparatus as set forth in claim 12 wherein a portion of said third leg is disposed in said gap.

* * * * *

UNITED STATES PATENT AND TRADEMARK OFFICE
CERTIFICATE OF CORRECTION

PATENT NO. : 4,845,326
DATED : July 4, 1989
INVENTOR(S) : Rudd et al

It is certified that error appears in the above-identified patent and that said Letters Patent is hereby corrected as shown below:

Col. 7, line 52, after "temperature" insert --at least substantially equal to welding temperature--

Col. 8, line 10, "substantiality" should read --substantially--

Signed and Sealed this

Fourteenth Day of August, 1990

Attest:

HARRY F. MANBECK, JR.

*Attesting Officer*  *Commissioner of Patents and Trademarks*